United States Patent [19]

Ando et al.

[11] 3,846,363
[45] Nov. 5, 1974

[54] ADHESIVE CRAYON COMPOSITION CONTAINING SORBITOL-BENZALDEHYDE REACTION PRODUCT AS ADDITIVE

[75] Inventors: Takuo Ando, Ibaraki; Hiroyuki Yamazaki, Toyonaka, both of Japan

[73] Assignee: Nippon Gohsei Kagaku Kogyo Kabushiki Kaisha, Osaka-shi, Japan

[22] Filed: Jan. 28, 1972

[21] Appl. No.: 221,767

[30] Foreign Application Priority Data
  Feb. 3, 1971  Japan.................................. 46-4104
  May 31, 1971  Japan................................ 46-38019
  June 2, 1971  Japan................................ 46-38896

[52] U.S. Cl. .................... 260/29.6 BM, 260/29.6 E
[51] Int. Cl.......... C09j 3/12, C08f 3/56, C09j 3/00, C09j 3/14
[58] Field of Search........... 260/29.6 E; 117/122 PA

[56] References Cited
UNITED STATES PATENTS

| | | | |
|---|---|---|---|
| 3,267,052 | 8/1966 | Brennan................................ | 260/5 |
| 3,539,481 | 6/1968 | Parker.................................. | 260/27 |
| 3,576,776 | 12/1968 | Muszik................................ | 117/122 |

Primary Examiner—William H. Short
Assistant Examiner—Peter F. Kulosky
Attorney, Agent, or Firm—Clelle W. Upchurch

[57] ABSTRACT

An adhesive crayon consisting of (1) an adhesive resin soluble in a mixture of water and a water-miscible organic solvent, (2) water, (3) the organic solvent and (4) a reaction product of sorbitol and benzaldehyde with or without a boron compound has a constant hardness, excellent adhesiveness and good shape-stability in a wide range of temperature and humidity.

6 Claims, No Drawings

ADHESIVE CRAYON COMPOSITION CONTAINING SORBITOL-BENZALDEHYDE REACTION PRODUCT AS ADDITIVE

BACKGROUND OF THE INVENTION

The present invention relates to a novel adhesive crayon, and more particularly to an adhesive crayon having improved properties.

Recently, there has been marketed so-called "adhesive crayon", i.e., an adhesive of stick type, which is prepared by admixing a water-soluble resin such as polyvinyl pyrrolidone, water and a salt of aliphatic carboxylic acid such as sodium stearate at a high temperature and then placing the resultant viscous hot mass into containers such as employed for lipsticks, as described in the specification of U.S. Pat. No. 3,576,776.

Such an adhesive crayon is useful especially for office work because of easiness to handle than conventional liquid adhesives. However, the known adhesive crayon shows some disadvantages. For instance, the hardness of the crayon readily depends on temperature and humidity. Therefore, in hot season it may be too soft to hold a shape when it is spread on the surface to be bonded, and in cold season it may be too hard to be easily spread. Also, it shows an insufficient initial adhesion in many cases, and it may be not suitable for bonding transparent materials because it forms an opaque film. Furthermore, there may be some troubles in preparing the crayon and pouring it into containers because of necessity of kneading raw materials for a long period of 7 to 10 hours at a high temperature of about 90°C. and because of high viscosity of the resultant hot mass.

OBJECTS OF THE INVENTION

An object of the present invention is to provide a novel adhesive crayon having improved properties.

Another object of the invention is to provide an adhesive crayon which is free from any trouble as above-mentioned.

These and other objects of the invention will become apparent from the description hereinafter.

DESCRIPTION OF THE INVENTION

It has now been found that the above-mentioned objects can be accomplished in the development of an adhesive crayon comprising (1) an adhesive resin soluble in a mixture of water and a water-miscible organic solvent, (2) water, (3) the organic solvent and (4) the reaction product of sorbitol and benzaldehyde with or without a boron compound.

The adhesive crayon of the present invention can maintain a constant hardness or adhesiveness in a considerably wide temperature and humidity range. The crayon can be readily spread by rubbing it on a surface to be bonded to form a thin and uniform film. Besides, it can show an excellent initial adhesion. It may be transparent, and accordingly can be also preferably used to bond transparent sheets such as cellophane.

The crayon can be readily prepared by admixing the starting components as before-mentioned for a short time under heating. The product can be readily casted into a container because of its low viscosity. After solidified by cooling, it does not transform the shape even in case of maintaining at 90°C. for 10 minutes.

The adhesive crayon of the present invention is also free from troubles, such as tendency to thread or crease paper to be bonded which may occur when in case a conventional liquid adhesive is used. The adhesive can be applied after packed in suitable containers made of paper, plastics, metal, and the like. The use of containers such as for lipsticks is preferred. It can be widely employed for office work, household, handicraft or industrial uses. Especially, it is preferred for bonding papers, films, metal foils, boards, films, and the like.

As the said adhesive resins, synthetic resins which are soluble in a mixture of water and an organic solvent to give a tacky solution may be widely employed.

Examples of the adhesive resin are partially or completely hydrolyzed polyvinyl acetate, especially partially hydrolyzed polyvinyl acetate, or acetals or urethanates thereof; copolymers of a major part of vinyl acetate and a minor part of a copolymerizable monomer, e.g., olefines such as ethylene, propylene, ethylenically unsaturated carboxylic acids such as crotonic acid, acrylic acid, methacrylic acid, maleic acid, or anhydrides, salts, amides and esters thereof; partially or completely hydrolyzed products of the said copolymers, or acetals or urethanates thereof; polyacrylic acid, or alkali metal or ammonium salts thereof; polyacrylic acid amide, polyvinyl pyrrolidone, polyethylene oxide, polyethylene imine, vinyl methyl ether-maleic anhydride copolymer, and the like. Particularly, the use of a partially hydrolyzed vinyl acetate-crotonic acid copolymer is desirable, especially the same having 0.5 to 20 percent by mole in crotonic acid contents and 5 to 80 percent by mole in a degree of hydrolysis of vinyl acetate units. Larger crotonic acid contents than 20 percent by mole and smaller degree of hydrolysis than 5 percent by mole tend to make less easy the molding of the crayon, smaller crotonic acid contents than 0.5 percent by mole tend to make less tacky the crayon, and larger degree of hydrolysis than 80 percent by mole tends to cause coagulation in the preparation of the crayon.

Examples of the water-miscible organic solvent are alcohols such as methanol, ethanol, and isopropanol, polyhydric alcohols such as ethylene glycol, propylene glycol, diethylene glycol, glycerin, pentaerythritol, tetritol, pentitol and hexitol, ketones such as acetone, methyl ethyl ketone and cyclohexanone, esters such as methyl acetate and ethyl acetate, ethers such as diethyl ether, tetrahydrofuran, ethylene glycol monoethyl ether and dioxane, N-methyl-2-pyrrolidone, dimethylformamide, dimethylsulfoxide, N-dimethylacetamide, pyridine, acetonitrile, and the like. A water-inmiscible organic solvent can be also employed by preparing a water-miscible mixture of the same and another solvent. The reaction product of sorbitol and benzaldehyde as used in the present invention is prepared by adding benzaldehyde into an aqueous solution of sorbitol, further adding dropwise an acidic catalyst such as sulphuric or phosphoric acid with agitation and maintaining pH value at about 1 and the reaction temperature at about 25°C. by cooling, recovering the solid product by filtering the slurry-like reaction mixture, and washing with water and drying the product. The chemical structure of thus obtained product is not sure, but is deemed as monobenzylidenesorbitol, dibenzylidenesorbitol, tribenzylidenesorbitol or mixtures thereof. The reaction product of sorbitol, benzaldehyde and a boron compound can be also employed and the use thereof may give further improved properties of the crayon. Examples of the boron compound are boric acids such as orthoboric acid, metaboric acid and tetraboric acid, borates such as ammonium borate, potassium borate, sodium borate and borax and boric esters such as methyl borate and ethyl borate.

The reaction product of three components can be prepared by adding the boron compound to an aqueous solution of sorbitol at a room temperature or an elevated temperature with agitation, leaving the solution until its pH value falls to about 3, subjecting the solution to reaction with benzaldehyde in the manner as aforementioned. Alternatively, the boron compound may be added into a solution of sorbitol after the reaction of sorbitol and benzaldehyde is partially or completely carried out. The amount employed of boron compound and benzaldehyde is 0.1 to 2 moles and 1 to 3 moles to 1 mole of sorbitol, respectively.

In the present invention, it is essential to use all the said four components. Absence of either water or organic solvent results in failure of the formation of homogeneous mass or in the formation of mass having insufficient shape-stability and poor adhesive strength.

The ratio of the said four components may vary according to a kind of resin and materials to be bonded. But, in general, it is suitably employed to combine them in the range of 5 to 40 parts by weight of water, 10 to 60 parts by weight of the organic solvent and 0.2 to 20 parts by weight of the reaction product of sorbitol to 10 parts by weight of the adhesive resin.

If desired, a nonionic surface active agent as polyoxyethylene alkyl ether, polyoxyethylene fatty acid ester, sorbitan fatty acid ester of monoglyceride of fatty acid may further be used to increase transparency of the product. The suitable amount employed of the nonionic surface active agent is 1 to 5 parts by weight to 10 parts by weight of the adhesive resin.

The adhesive crayon can be usually prepared by admixing the said four components in a mixer provided with a stirrer such as screw or fan under heating to give a viscous hot mass and pouring the mass into containers, or extruding the said hot mass through a nozzle, and then cooling the mass until it solidifies.

If necessary, colorant, perfume, filler or pigment may be added. Higher fatty acids or fatty acid esters of higher alcohol may be combined for the purpose of regulating a hardness of the product.

The adhesive crayon of the present invention is more particularly described and explained by means of the following illustrative Examples, in which all "part" and "percent" are by weight unless otherwise described.

EXAMPLE 1

Four parts of hydrolyzed vinyl acetate-crotonic acid copolymer (crotonic acid contents: 4 percent by mole, a degree of hydrolysis of vinyl acetate units: 60 percent by mole), 1.5 parts of the reaction product of sorbitol and benzaldehyde, 3 parts of glycerin, 5 parts of water, 3.5 parts of methanol and 3.5 parts of dimethylformamide were admixed at 80°C. for 10 minutes. The resultant viscous hot mass was poured into a cylindrical container for lipstick made of polyethylene, and allowed to cool. The operations as above-mentioned were smoothly carried out because of a low viscosity of the hot mass. The obtained adhesive crayon was transparent and colorless solid and occured no discoloration nor clouding even after storage for a long period.

The adhesive was coated by rubbing it on the surface of craft paper. It can be spread smoothly to form a uniform and thin film on the surface without any threading.

The initial adhesion of the adhesive crayon was excellent.

The crayon showed almost constant hardness and adhesion under the various conditions of temperature and humidity, for example, 20°C. and 65 percent RH, 5°C. and 30 percent RH, and 35°C. and 100 percent RH.

The crayon kept the constant shape even after exposed to a high temperature of 100°C. for 10 minutes.

The transformation of the shape of the crayon in case of its application was not observed, and the crayon could be applied even on a narrow spot.

The test results were shown in Table 1.

COMPARATIVE EXAMPLE 1

Four parts of hydrolyzed vinyl acetate-crotonic acid copolymer the same as employed in Example 1, one part of sodium stearate, 3 parts of glycerin, 5 parts of water and 3.5 parts of methanol were admixed at 90°C. for 8 hours. Thus obtained viscous hot mass was poured into a cylindrical container but with some troubles because of high viscosity of the hot mass. After cooling, the obtained adhesive crayon having a white and cloudy appearance was applied on the surface of craft paper, but a film having uneven thickness was formed on the surface. The adhesive turned to yellow after placed for several days.

Under the condition of 5°C. and 30 percent RH, the crayon became too hard to be smoothly applied. On the other hand, under the condition of 35°C. and 100 percent RH, the adhesive became too soft to form a thin film on the surface. The crayon partially melted after exposed to an elevated temperature of 70°C. for several minutes.

The test results were shown in Table 1.

EXAMPLE 2

The procedure of Example 1 was repeated except that one part of polyoxyethylene lauryl ether was further added to the ingredients of Example 1. Thus prepared crayon was more transparent than that of Example 1 and letters could be readily read through the said adhesive layer having a thickness of 2 cm. Other properties of the crayon were approximately the same as obtained in Example 1.

The results were shown in Table 1.

EXAMPLE 3

Four parts of polyvinyl alcohol (a degree of polymerization: 1,700, a degree of hydrolysis: 88 percent by mole), 1.5 parts of the reaction product of sorbitol aand benzaldehyde, 3 parts of glycerin, 6 parts of water and 3.5 parts of dimethylformamide were admixed at 80°C. for 30 minutes. The resultant hot mass was poured into a cylindrical container and then allowed to cool up to a room temperature.

The test results were shown in Table 1.

EXAMPLE 4

The procedure of Example 3 was repeated except that polyvinyl pyrrolidone having a molecular weight of about 360,000 was employed instead of polyvinyl alcohol.

The results were shown in Table 1.

COMPARATIVE EXAMPLE 2

A mixture of 47 parts of water, 14 parts of glycerin and 7 parts of sodium stearate was heated at 90°C. for 1 hour with agitation. Into the obtained solution 32 parts of polyvinyl pyrrolidone having a molecular weight of about 360,000 was added and the agitation was continued at 90°C. for 6 hours. Thus obtained viscous hot mass was poured into a cylindrical container and allowed to cool. Various properties of the adhesive crayon thus obtained were near to those in Comparative Example 1.

The test results were shown in Table 1.

EXAMPLE 5

Five parts of polyvinyl acetate, 0.2 part of the reaction product of sorbitol and benzaldehyde, 2 parts of diethylene glycol and 5 parts of methanol were kneaded and heated at 65°C. for 10 minutes with agitation. The resultant mixture was poured into a cylindrical container and allowed to cool up to a room temperature. Thus obtained adhesive crayon was colorless and transparent.

The test results were shown in Table 1.

EXAMPLE 6

The procedure in Example 5 was repeated except that vinyl acetate-ethyl acrylate copolymer (ethyl acrylate contents: 20 percent by mole) was employed instead of polyvinyl acetate.

The test results were shown in Table 1.

weight, bonded to another sheet of the same craft paper by applying an adhesive and fixing the both sheets and then pressing for a certain period by means of a rubber roll loaded up to 30 kg. in total weight.

X: The adhesive layer was peeled.
Δ: A part of paper layer was peeled.
O: Almost all the paper layer was peeled.

4. Hardness was measured according to Japanese Industrial Standard (JIS) K 2530 by using a penetrometer as used for asphalt and was shown by a depth of penetration for 3 sec. of a needle loaded up to 46.3 g. in total weight.

5. The shape-stability was shown by the number of cycle of putting an adhesive crayon out and in repeatedly, which was packed in a cylindrical container of 15 mm. in diameter, made of polyethylene and provided with a screw used for putting out and in a content, by operating the screw until it became impossible to set the crayon in the container.

EXAMPLE 7

A sorbitol derivative was prepared as follows: To a 70 percent aqueous solution of sorbitol was added boric acid in the ratio of equi-molar amount to the sorbitol employed and the aqueous solution was agitated at a room temperature for one hour. To the said solution was added twice amounts of benzaldehyde in molar ratio, pH was adjusted to 1 with phosphoric acid and then the reaction was carried out at 25°C. for 10 hours. The obtained white paste was washed with water, and dried to give a desired sorbitol derivative.

Table 1

| Ex. No. | Peeling strength (kg/cm$^2$) | Shearing strength (kg/cm$^2$) | Initial adhesion | | | | | | | | | | Hardness ($10^{-1}$ mm) | Shape-stability (cycle) |
|---|---|---|---|---|---|---|---|---|---|---|---|---|---|---|
| | | | $t_{10}$ (sec) | $t_{15}$ (sec) | $t_{20}$ (sec) | $t_{30}$ (sec) | $t_{45}$ (sec) | $t_{60}$ (sec) | $t_{80}$ (sec) | $t_{100}$ (sec) | $t_{120}$ (sec) | $t_{140}$ (sec) | | |
| 1 | 0.44 | 5.63 | X | Δ | O | O | O | O | O | O | O | O | 132 | >100 |
| 2 | 0.35 | 4.17 | X | X | X | Δ | O | O | O | O | O | O | 158 | >100 |
| 3 | 0.27 | 3.91 | X | X | Δ | O | O | O | O | O | O | O | 180 | >100 |
| 4 | 0.30 | 4.06 | X | X | Δ | O | O | O | O | O | O | O | 145 | >100 |
| 5 | 0.42 | 5.50 | Δ | O | O | O | O | O | O | O | O | O | 122 | >100 |
| 6 | 0.38 | 4.99 | X | Δ | O | O | O | O | O | O | O | O | 129 | >100 |
| Com. Ex. No. 1 | 0.15 | 2.69 | X | X | X | X | X | X | X | X | Δ | O | 91 | 8 |
| Com. Ex. No. 2 | 0.17 | 2.95 | X | X | X | X | X | X | X | X | Δ | O | 86 | 10 |

(NOTE)

1. The peeling strength was measured by an autograph in the manner of peeling an aluminum foil of 0.06 mm. in thickness, which was bonded to another same foil of 25 mm. × 100 mm. by applying an adhesive on the surface of either foil within an area of 25 mm. × 25 mm. at 20°C. and 65 percent RH and fixing two foils and then pressing at a pressure of 50 kg./25 mm. × 25 mm., under the conditions of tensile rate of 200 mm./min. and peeling angle of 180°.

2. The shearing strength was measured on the same sample as used in the test of peeling strength under the conditions of a tensile rate of 10 mm./min. and a shearing angle of 0°.

3. The initial adhesion was measured by observing the breaking state of paper layer, which is occured by peeling rapidly a sheet of craft paper of 25 mm. × 100 mm. in size, 0.13 mm. in thickness and 68.5 g./m.$^2$ in Ten parts of hydrolyzed vinyl acetate-crotonic acid copolymer (crotonic acid contents: 3 percent by mole, a degree of hydrolysis of vinyl acetate units: 55 percent by mole), 12.5 parts of water, 17.5 parts of methanol, 17.5 parts of N-methyl-2-pyrrolidone, 7.5 parts of ethylene glycol and 3 parts of the said sorbitol derivative were admixed at 95°C. for 10 minutes. The obtained hot mass was poured into a cylindrical container and allowed to cool up to a room temperature. As a result, the adhesive crayon had the same appearance and properties as described in Example 1.

The test results were shown in Table 2.

COMPARATIVE EXAMPLE 4

The procedure in Comparative Example 1 was repeated except that 10 parts of partially hydrolyzed vinyl acetate-crotonic acid copolymer, 2.5 parts of sodium stearate, 7.5 parts of ethylene glycol, 12.5 parts of water and 17.5 parts of methanol were employed as starting materials.

The test results were shown in Table 2.

EXAMPLE 8

The procedure in Example 7 was repeated except that 2.5 parts of polyoxyethylene lauryl ether was added to the ingredients of Example 7. Thus obtained adhesive crayon was more transparent than that in Example 7 and letters were readily read through the said adhesive layer having a thickness of 2 cm. The adhesive had the same properties as described in Example 7.

The test results were shown in Table 2.

EXAMPLE 9

A sorbitol derivative was prepared as follows: To a 70 percent aqueous solution of sorbitol was added boric acid in the ratio of twice molar amounts to the sorbitol employed and the mixture was allowed to stand at a room temperature for one hour with agitation. After adding one mole of benzaldehyde to the said mixture, pH was adjusted to 1 with phosphoric acid and then reaction was carried out at 40°C. for 3 hours to give a desired sorbitol derivative.

Ten parts of partially hydrolyzed vinyl acetate-crotonic acid copolymer (crotonic acid contents: 12 percent by mole, a degree of hydrolysis of vinyl acetate units: 35 percent by mole), 15 parts of water, 20 parts of methanol, 15 parts of dimethylformamide, 6 parts of glycerin and 4 parts of the said sorbitol derivative were kneaded at 90°C. for 10 minutes. The resultant viscous hot mass was poured into a cylindrical container and allowed to cool. The obtained adhesive crayon has extremely excellent properties the same as described in Example 7.

The test results were shown in Table 2.

yvinyl acetate employed in Example 10, 2.5 parts of sodium myristate, 8 parts of glycerin, 10 parts of water and 10 parts of methanol were admixed at 90°C. for 8 hours. The obtained adhesive had the same appearance and properties as described in Comparative Example 1.

The test results were shown in Table 3.

COMPARATIVE EXAMPLE 5

The procedure in Comparative Example 4 was repeated except that 47 parts of water, 14 parts of glycerin and 7 parts of sodium stearate were heated at 90°C. for one hour and then 32 parts of polyvinyl pyrrolidone having a molecular weight of 360,000 was added and further admixed at 90°C. for 6 hours.

The test results were shown in Table 3.

EXAMPLE 11

The procedure in Example 10 was repeated except that vinyl acetate-maleic anhydride copolymer (maleic anhydride contents: 3 percent by mole, a degree of hydrolysis of vinyl acetate units: 90 percent by mole) was employed instead of polyvinyl acetate. The obtained adhesive crayon was transparent and colorless, and the applying property and the stabilities for temperature and humidity were satisfied for practical use.

The test results were shown in Table 3.

EXAMPLE 12

A sorbitol derivative was prepared as follows: To a 70 percent aqueous solution of sorbitol was added borax in the ratio of 0.25 mole to one mole of the sorbitol employed and the agitation was carried out at a room temperature for one hour to occur reaction. After adding one mole of benzaldehyde and a small amount of anhydrous calcium chloride to the solution, the mixture was

TABLE 2

| | Peeling strength (kg./cm.²) | Shearing strength (kg./cm.²) | Initial adhesion (sec.) | | | | | | | | | | Hardness (10⁻¹ mm.) | Shape-stability (cycle) | Compressive breaking strength (g./2 mm.φ) |
|---|---|---|---|---|---|---|---|---|---|---|---|---|---|---|---|
| | | | $t_{10}$ | $t_{15}$ | $t_{20}$ | $t_{30}$ | $t_{45}$ | $t_{60}$ | $t_{80}$ | $t_{100}$ | $t_{120}$ | $t_{140}$ | | | |
| Example No.: | | | | | | | | | | | | | | | |
| 7 | 0.44 | 5.63 | X | △ | ○ | ○ | ○ | ○ | ○ | ○ | ○ | ○ | 69 | >100 | 210 |
| 8 | 0.35 | 4.17 | X | X | X | △ | ○ | ○ | ○ | ○ | ○ | ○ | 85 | >100 | 170 |
| 9 | 0.38 | 4.99 | X | △ | ○ | ○ | ○ | ○ | ○ | ○ | ○ | ○ | 80 | >100 | 203 |
| Com. Ex. No.: 3 | 0.15 | 2.69 | X | X | X | X | X | X | X | X | △ | ○ | 91 | 8 | 74 |

(NOTE)

Compressive breaking strength was measured by compressing in vertical direction with a discoid sample of 14.5 mm. in diameter and of 5 mm. in thickness, by using a TENSILON tester.

EXAMPLE 10

The procedure in Example 1 was repeated except that 10 parts of partially hydrolyzed polyvinyl acetate (a degree of hydrolysis: 60 percent by mole), 10 parts of water, 10 parts of methanol, 8 parts of N-methyl-2-pyrrolidone, 8 parts of ethylene glycol and 1.5 parts of the sorbitol derivative the same as described in Example 7 were employed as starting materials.

The test results were shown in Table 3.

COMPARATIVE EXAMPLE 4

The procedure in Comparative Example 1 was repeated except that 10 parts of partially hydrolyzed polfurther subjected to reaction at 20°C. for 24 hours to give a desired sorbitol derivative.

On the other hand, 10 parts of vinyl methyl ether-maleic anhydride copolymer (vinyl methyl ether contents: 50 percent by mole), 8 parts of water, 12 parts of methanol, 9 parts of dimethylformamide, 8 parts of glycerin and 1.5 parts of the said sorbitol derivative where kneaded at 90°C. for 10 minutes.

The resultant viscous hot mass was poured into a cylindrical container and allowed to cool up to a room temperature.

The adhesive crayon thus obtained was rather white and the properties such as shape-stability, applying property, stabilities for temperature and humidity, initial tackiness and initial adhesion was satisfied for practical use.

The test results were shown in Table 3.

EXAMPLE 13

The procedure in Example 12 was repeated except that vinyl acetate-ethylene copolymer (ethylene contents: 20 percent by mole) was employed as a copolymer. The obtained adhesive crayon had the same properties as described in Example 12.

The test results were shown in Table 3.

TABLE 3

| | Peeling strength (kg./cm.²) | Shearing strength (kg./cm.²) | Initial adhesion (sec.) | | | | | | | | | | Hardness (10⁻¹ mm.) | Shape-stability (cycle) | Compressive breaking strength (g./2 mm.φ) |
|---|---|---|---|---|---|---|---|---|---|---|---|---|---|---|---|
| | | | $t_{10}$ | $t_{20}$ | $t_{30}$ | $t_{45}$ | $t_{60}$ | $t_{80}$ | $t_{100}$ | $t_{120}$ | $t_{140}$ | | | |
| Example No.: | | | | | | | | | | | | | | | |
| 10 | 0.27 | 3.71 | X | X | △ | ○ | ○ | ○ | ○ | ○ | ○ | 88 | >100 | 165 |
| 11 | 0.30 | 3.85 | X | X | △ | ○ | ○ | ○ | ○ | ○ | ○ | 72 | >100 | 180 |
| 12 | 0.22 | 3.22 | X | X | X | △ | ○ | ○ | ○ | ○ | ○ | 84 | 90 | 160 |
| 13 | 0.22 | 3.25 | X | X | △ | ○ | ○ | ○ | ○ | ○ | ○ | 90 | 95 | 158 |
| Com. Ex. No.: | | | | | | | | | | | | | | | |
| 4 | 0.10 | 1.98 | X | X | X | X | X | X | X | △ | ○ | 92 | 10 | 70 |
| 5 | 0.14 | 2.03 | X | X | X | X | X | X | X | △ | ○ | 103 | 8 | 66 |

EXAMPLE 14

A sorbitol derivative was prepared as follows: To a 70 percent aqueous solution of sorbitol was added borax in the ratio of 0.25 mole to one mole of the sorbitol employed and the mixture was agitated at a room temperature for one hour to occur reaction quantitatively. After adding further 2 moles of benzaldehyde, pH was adjusted to 1 with sulfuric acid and then the reaction was carried out at 25°C. for 24 hours. Thus obtained white paste was washed with water and dried to give a desired sorbitol derivative.

On the other hand, 10 parts of hydrolyzed vinyl acetate-crotonic acid copolymer (crotonic acid contents: 3 percent by mole, a degree of hydrolysis of vinyl acetate units: 55 percent by mole), 17 parts of water, 9 parts of methanol, 9 parts of N-dimethylacetamide, 3 parts of ethylene glycol and 3 parts of the said sorbitol derivative were admixed at 95°C. for 10 minutes. The obtained viscous hot mass was poured into a cylindrical container and allowed to cool.

The test results were shown in Table 4.

EXAMPLE 15

The procedure in Example 14 was repeated except that 2.5 parts of polyoxyethylene lauryl ether was further added to the ingredients of Example 14.

The test results were shown in Table 4.

EXAMPLE 16

A sorbitol derivative was prepared as follows: To a 70 percent aqueous solution of sorbitol was added borax in the ratio of equi-molar amount to the sorbitol employed and the reaction was carried out at a room temperature with agitation. After adding 2 moles of benzaldehyde, pH was adjusted to 1 with phosphoric acid and the mixture was subjected to reaction at 30°C. for 24 hours to give a desired sorbitol derivative.

The procedure in Example 9 was repeated except that the said sorbitol derivative was employed to give an adhesive crayon.

The test results were shown in Table 4.

What we claim is:

1. In an adhesive crayon comprising
   1. an adhesive resin selected from the group consisting of partially or completely hydrolyzed polyvinyl acetate, hydrolyzed vinyl acetate-crotonic acid copolymer, hydrolyzed vinyl acetate-maleic anhydride copolymer, vinyl methyl ether-maleic anhydride copolymer, vinyl acetate-ethylene copolymer, hydrolyzed vinyl acetate-ethylene copolymer and polyvinyl pyrrolidone,
   2. water, and
   3. a water-miscible organic solvent, the improvement which comprises incorporating therein a reaction product prepared by reacting 1 mole of sorbitol and 1 to 3 moles of benzaldehyde with or without 0.1 to 2 moles of a boron compound; water, said water-miscible organic solvent and said reaction product being employed in the ratio of 5 to 40, 10 to 60 and 0.2 to 20 parts by weight, respectively, to 10 parts by weight of said adhesive resin.

2. The adhesive crayon of claim 1, wherein said boron compound is a member selected from the group consisting of boric acid and borax.

3. The adhesive crayon of claim 1, wherein said adhesive resin is a hydrolyzed vinyl acetate-crotonic acid copolymer.

4. The adhesive crayon of claim 3, wherein said hydrolyzed vinyl acetate-crotonic acid copolymer has 5 – 20 percent by mole of crotonic acid contents.

5. The adhesive crayon of claim 1, wherein said water-miscible organic solvent is at least one member selected from the group consisting of methanol, ethanol, ethylene glycol, diethylene glycol, glycerin, dimethylformamide, dimethylacetamide, N-methyl-2-pyrrolidone and ethylene glycol monoethyl ether.

6. A process for preparing an adhesive crayon which comprises admixing
   1. 10 parts by weight of an adhesive resin selected from the group consisting of partially or completely hydrolyzed polyvinyl acetate, hydrolyzed vinyl acetate-crotonic acid copolymer, hydrolyzed vinyl acetate-maleic anhydride copolymer, vinyl methyl ether-maleic anhydride copolymer, vinyl acetate-ethylene copolymer, hydrolyzed vinyl acetate-ethylene copolymer and polyvinyl pyrrolidone,
   2. 5 to 40 parts by weight of water,

TABLE 4

| | Peeling strength (kg./cm.²) | Shearing strength (kg./cm.²) | Initial adhesion (sec.) | | | | | | | | | | Hardness (10⁻¹ mm.) | Shape-stability (cycle) | Compressive breaking strength (g./2 mm.φ) |
|---|---|---|---|---|---|---|---|---|---|---|---|---|---|---|---|
| | | | $t_{10}$ | $t_{15}$ | $t_{20}$ | $t_{30}$ | $t_{45}$ | $t_{60}$ | $t_{80}$ | $t_{100}$ | $t_{120}$ | $t_{140}$ | | | |
| 14 | 0.42 | 5.58 | X | X | △ | ○ | ○ | ○ | ○ | ○ | ○ | ○ | 65 | >100 | 190 |
| 15 | 0.38 | 4.32 | X | X | X | X | △ | ○ | ○ | ○ | ○ | ○ | 79 | >100 | 145 |
| 16 | 0.35 | 4.70 | X | X | X | △ | ○ | ○ | ○ | ○ | ○ | ○ | 76 | >100 | 182 |

3. 10 to 60 parts by weight of a water-miscible organic solvent, and
4. 0.2 to 20 parts by weight of a reaction product prepared by reacting 1 mole of sorbitol and 1 to 3 moles of benzaldehyde with or without 0.1 to 2 moles of boron compound to 1 mole of sorbitol for a short time under heating to give a viscous hot mass and molding the mass into a sticky shape.

* * * * *